United States Patent [19]

Lebel

[11] Patent Number: 4,529,863

[45] Date of Patent: Jul. 16, 1985

[54] GAS METAL ARC WELDING METHOD

[75] Inventor: Jean-Claude Lebel, Boulogne-Billancourt, France

[73] Assignee: P.P.I. Performance Process International, Curacao, Netherlands Antilles

[21] Appl. No.: 528,504

[22] Filed: Sep. 1, 1983

[51] Int. Cl.³ .............................................. B23K 9/16
[52] U.S. Cl. .................................. 219/137.42; 219/74; 219/137.2
[58] Field of Search ........... 219/137.2, 137.31, 137.42, 219/74, 75

[56] References Cited

U.S. PATENT DOCUMENTS

| 3,139,507 | 6/1964 | Kaesmacher | 219/74 |
| 3,470,346 | 9/1969 | Duboz et al. | 219/74 |
| 3,496,323 | 2/1970 | Lesnewich et al. | 219/137.42 X |
| 4,100,389 | 7/1978 | Tanaka et al. | 219/74 |

FOREIGN PATENT DOCUMENTS 66382 6/1981 Japan ..................................... 219/74

OTHER PUBLICATIONS

Cary, Howard B. *Modern Welding Technology*, 1979, "Gas Metal Arc Welding" pp. 148–158.

*Primary Examiner*—Roy N. Envall, Jr.
*Assistant Examiner*—C. M. Sigda
*Attorney, Agent, or Firm*—Cullen, Sloman, Cantor, Grauer, Scott and Rutherford

[57] ABSTRACT

A gas-metal-arc welding method is provided for high speed, high melting rate, substantially spatter-free, all-position welding. The method is particularly useful for out-of-position welding, that is, to produce vertical, inclined and overhead welds. A consumable wire electrode is held within and fed through the tubular contact tip of a continuous feed type welding gun having a tubular nozzle surrounding and extending beyond the tip. A shielding gas, formed of unique ratios of a minor proportion of a carbon dioxide and oxygen mixture combined with a major proportion of an argon and helium mixture, is flowed in a substantially longitudinally laminar pattern between the nozzle and contact tip and along the electrode extension from the tip. The contact tip is cooled, and sufficiently high power electrical current is passed through the contact tip and electrode extension to produce the arc and to melt the end of the electrode into molten drops for short-circuiting (e.g., low current) or for spray (e.g., higher current) transfer of the drops to the weld deposit. The electrode extension is pre-heated by maintaining a long electrode extension or stick-out beyond the contact tip end, with a substantial portion of the extension recessed within the nozzle.

7 Claims, 7 Drawing Figures

U.S. Patent   Jul. 16, 1985   4,529,863
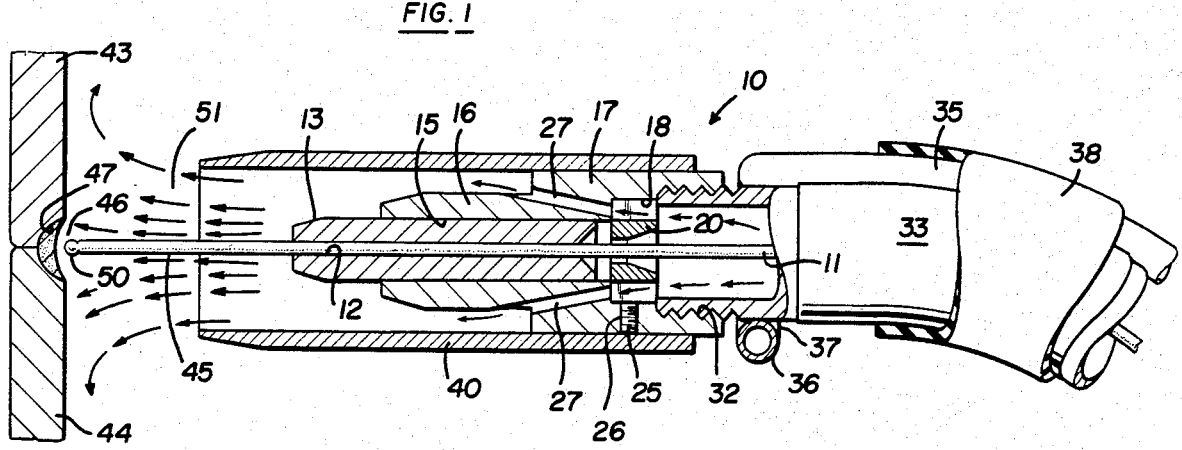
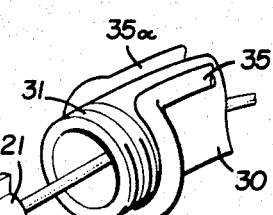
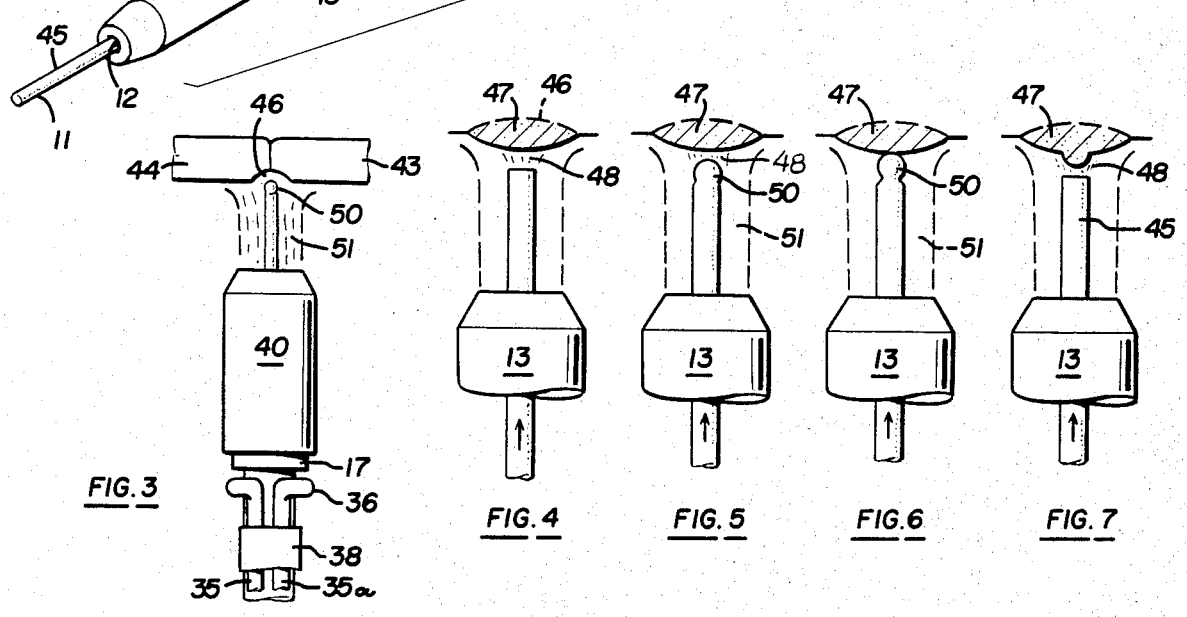

GAS METAL ARC WELDING METHOD

BACKGROUND OF INVENTION

This invention relates to an improved gas-metal-arc welding method which is particularly useful in out-of-position welding, although it also can be utilized for the flat position. The method is particularly concerned with utilizing a shielding gas formed of a four gas mixture, namely argon and helium with minor amounts of carbon dioxide and oxygen. The welding is performed with a continuous feed, consumable wire electrode gas-shielded-arc welding gun.

This invention is particularly concerned with improvements to a four gas mixture shielded arc, consumable wire welding process earlier invented by John G. Church and disclosed in his U.S. patent application, Ser. No. 404,722 filed Aug. 3, 1982. The general concept of using a four gas mixture was known, having been disclosed, for example, in U.S. Pat. No. 3,139,506 issued June 30, 1964 to Wolff et al, and also, in U.S. Pat. No. 2,907,866 issued Oct. 6, 1959 to Yenni et al and U.S. Pat. No. 2,946,847 issued Aug. 2, 1960 to Craig et al.

Contrasting with the gas mixtures disclosed in the above prior art patents, the Church process focuses upon specific formulation ranges of such gases in the mixture, which have been found to produce unusual and unexpected welding effects. Significantly among these effects are very high melting rates, with corresponding unusually high deposition rates as compared with prior processes. The welds produced have been of superior quality with respect to bead shape, penetration, uniformity, mechanical characteristics such as resistance to brittle fracture, good grain structure, reduced porosity and the like.

The earlier Church process has been utilized with a unique welding gun which is disclosed in the U.S. patent application of John G. Church and Emerson G. Malone, U.S. Ser. No. 349,141 filed Feb. 16, 1982. A consumable wire electrode is fed through a tubular contact tip which is surrounded by a tubular nozzle. The contact tip free end is substantially recessed within the nozzle so that there is an unusually long electrode extension or "stick-out" from the gun contact tip to the end of the electrode where the arc is produced. Roughly half of the electrode extension is recessed within and surrounded by the nozzle. The shielding gas is flowed around the tip and electrode extension, and through the nozzle in a substantially longitudinal laminar pattern. The contact tip is vigorously cooled by conduction due to an external liquid cooling conduit wrapped around the gun end which is remote from the electrode extension.

Consumable wire gas-shielded-arc arc welding guns are known. For example, guns of this type are disclosed in U.S. Pat. No. 3,283,121 issued Nov. 1, 1966 to Barnard et al for an arc welding gun; U.S. Pat. No. 3,469,070 issued Sept. 23, 1969 to Barnard et al for an arc welding gun; and British Patent Specification No. 1,094,008 published Dec. 6, 1967, filed by Linde Aktiengesellschaft in the name of Hildebrandt et al, for gas-shielded-arc welding torches. These disclosures are of different gun constructions utilizing shielding gas flowed around the contact tip, within nozzles and with means for cooling the guns.

The Church process contemplates the deposition of large, molten globules, which are formed on the end of the electrode, by a free-fall or free-flight technique. That is, by application of sufficiently high electrical power to the electrode, large globules of molten material successively form on the end of the electrode, at the arc gap. The globules detach from the electrode and fall into the weld pool or deposit, principally through the effect of gravitational forces.

This free flight transfer is essentially limited to flat position welding, that is, where the arc gap is located below the electrode end. Thus, although a substantial part of commercial welding is done in the flat position, there is a need for adapting the Church process for welding in all positions, that is, particularly for welding in out-of-position, such as overhead welding.

SUMMARY OF INVENTION

The gas metal arc welding process of this invention is particularly useful for out-of-position, that is, vertical, inclined and overhead welding, in addition to being usable for flat position welding. It has been discovered that by combining particular four gas mixture ratios with a consumable wire electrode, continuous feed, form of gas-shielded-arc welding gun that provides a substantially laminar gas flow longitudinally of the electrode axis, with a pre-heated electrode extension resulting from a long "stick-out", and cooling the gun contact tip through which the electrode passes, that a substantially spatter-free, high deposition rate of high quality weld can be achieved through the use of a short-circuiting transfer mode of deposition technique. This permits welding in all positions with all of the benefits of the Church process. Further, it has been discovered that this method can be utilized with a longer arc gap, for spray transfer which is useful for a fast melting rate in the flat position.

The shielding gas contemplated is a unique formulation of a proportionally high volume mixture of two "noble" gases, namely, argon and helium, combined with a proportionally low volume mixture of carbon dioxide and oxygen. The oxygen is in a very low range, such as between about 0.1 to 1% by volume. The formulation is similar to, but more focused than that disclosed in the Church patent application identified above.

It has been found that the combination of the particular gas mixture formulations, can be even further focused into three general formulation families or groups, namely for welding low carbon or mild steel, low alloy steel and stainless steel. When these formulations are used with the long stick-out, cooled contact tip, laminar flow features and with the short-circuiting, transfer mode of deposition technique (with lower electrical power) or with the spray transfer technique (with higher power), unexpectedly superior welds are produced with extremely high melting rates and weld deposition rates. Moreover, unexpectedly and at present, inexplicably, the arc is remarkably stable and splatter-free and the deposited drops move axially of the electrode to the weld pool. This permits accurate, controlled and excellent weld formation in the overhead, as well as in the other out-of-position welding positions.

An important object of this invention is to provide a high melting rate, spatter-free, welding method which is universally useful and particularly useful for out-of-position welding, and which deposits the molten drops in a controlled, axial direction.

Other objects and advantages will become apparent upon reading the following description, of which the attached drawings form a part.

DESCRIPTION OF DRAWINGS

FIG. 1 schematically illustrates, in cross-section, a continuous feed, consumable wire welding gun with the gun depositing an out-of-position bead.

FIG. 2 illustrates an exploded, perspective view, of the basic parts of the welding gun.

FIG. 3 illustrates the gun, to a reduced scale, arranged upside-down for overhead welding, applying a joining weld on the lower surfaces of abutting plates.

FIGS. 4-7 schematically illustrate successive steps in the short-circuiting transfer, used when welding in the overhead position.

DETAILED DESCRIPTION

FIG. 1 schematically illustrates a consumable wire welding gun. Since the gun per se is not the subject of the invention of this present application, the gun is illustrated without the usual handle grip, and the usual feed mechanism for feeding the wire electrode through the gun, and the power source and the gas tanks which supply the gas mixture, and the like. For illustrative purposes, those known, commercially available elements, whose construction is irrelevant to the present method, are omitted.

The gun is a continuous feed, consumable wire electrode gas-metal-arc-welding gun 10. A wire electrode 11 extends through the central bore 12 of the gun's copper tubular contact tip 13. The wire electrode is axially fed through the contact tip by a conventional wire feeder, not illustrated.

The contact tip 13 is fitted within the bore 15 of a gas diffuser member 16 which has an enlarged cylindrical inner end 17. An enlarged counterbore 18 in the cylindrical inner end 17 receives a space 20.

The spacer 20 is formed of a tubular body 21 having fins or ribs 22 formed thereon. The spacer snugly fits within the counterbore 18 and is held in place by means of a spacer set screw 25 threadedly engaged within a threaded hole 26 through the enlarged cylindrical inner end 17 of the gas diffuser.

The tubular contact tip may be slid endwise within the bore 15 in the gas diffuser until it bottoms out against the spacer 20. Alternatively, it may be moved away from the spacer, as is illustrated in FIG. 1, for adjusting its effective length. The contact tip is frictionally locked in position by a conventional frictional fastening means. For example, a set screw may be used. Another common locking means is making a portion of the contact tip out-of-round or slightly oval, with a corresponding out-of-round or oval depression formed in the bore 15 of the diffuser 17. Thus, merely twisting the contact tip will wedge it into locking position. Since these are conventional connections, they are not illustrated here. Likewise, the tip can be simply tightly fitted into the bore and in that way held in place.

A number of gas flow passageways 27 are formed in the diffuser. These extend from the counterbore 18 to the junction between the enlarged cylindrical end 17 and the smaller diameter main portion of the diffuser. The passages are spaced apart and are arranged at a very shallow angle relative to the axis of the diffuser. Preferably the angle is at approximately 15°.

A copper tube 30 having a threaded end 31 connects with a threaded socket 32 formed in the enlarged cylindrical end 17 of the diffuser. This tube carries electricity and the wire electrode. An electrical insulating sleeve 33 is arranged around the tube.

In order to cool the diffuser, which is preferably made of brass or copper, and the copper contact tip so that they can handle the considerable heat generated by high electrical power, a coolant tube 35 is arranged along the tube 30. The coolant tube has a circular bend or wrap-around 36 located at the threaded end 31 and then has a return tube portion 35a. By pumping cold water through the tube 35, the wrap-around 36 and then back out through the return leg 35a, at a relatively high rate, as for example, at 1½ gallons per minute, the end of the copper tube 30 is chilled. Due to conduction, the diffuser and the contact tip are also vigorously cooled. This permits them to handle higher electrical loads. Significantly, the cooling system is very simple, with no complicated internal passageways or seals and the like, such as have been used in prior guns.

In order to insure good cooling contact between the wrap-around 36 and the copper tube 30, a good brazed connection 37 is formed between them, such as a silver braze which gives good heat conductivity.

A suitable sleeve grip 38 is arraged around the copper tube, insulating sleeve 33 and cooling tube 35—35a. Further insulating or protective sleeves may be used and typically, a hand grip is also provided for holding, as well as controlling the operation.

An elongated tubular nozzle 40 surrounds the diffuser and contact tip and is either frictionally secured to or is threadedly secured to or secured by screws, to the cylindrical inner end 17 of the diffuser. The sleeve has a relatively smoother interior wall of uniform diameter. The sleeve is made of a material which is suitable for insulating and for handling the heat. Thus it may be made either of a single material and a single thickness or alternatively, it may be formed of a lamination with the interior lamina being of a material which is better able to resist the heat.

The operation of the welding gun is schematically shown in FIG. 1 in welding, or joining together, a pair of ferrous metal plates 43 and 44 whose edges are butted together.

The electrode extension 45, commonly called the "stick-out", is considerably longer than in normal welding. That is, the end of the tubular control tip is well recessed within the nozzle 40 so that approximately half of the stick-out is within the nozzle and the other half extends beyond it. This extra long stick-out provides increased electrical resistance which results in preheating the wire electrode to considerably hotter than normal.

When welding, successive molten drops are formed on the end of the electrode. Using a short arc, the molten drop is formed, in the arc gap 46, closely adjacent to the molten weld deposit or weld pool 47. The arc 48 (see FIG. 4) is maintained as the drop 50 grows (see FIG. 5) until it physically contacts the surface of the weld pool 47 (see FIG. 6). At that point, a short circuit takes place which momentarily extinguishes the arc, and the drop is drawn into the molten pool. The separation of the drop from the end of the electrode results in the reestablishment of the arc 48 (see FIG. 7). This sequence is repeated rapidly and is known as the short circuiting, short arc weld deposit technique.

During the welding operation, the shielding gas flows through the tube 30 and then between the fins 22 of the spacer 20 and through the passageways 27 in the diffuser. Because of the shallow angle of the passageways, the flow of gas is directed against the inner wall of the nozzle 40 where the gas is re-directed into a laminar flow parallel to the axis of the contact tip and the electrode. The gas shield 51 flows around the exposed portion of the stick-out, striking the workpiece around the weld and then dissipating.

The laminar flow of the gas, coupled with the long stick-out producing the pre-heated electrode, and the conductive form of cooling which cools the contact tip, are important. The energetic cooling effect of the circulation of cold water through the coolant tube permits higher electrical power flow and permits substantial pre-heating.

As previously mentioned, the gas is made up of a mixture of a major proportion of helium and argon with a much lower proportion of carbon dioxide and oxygen, with the oxygen particularly being in a very low range. The general formulation is as follows:

By volume, carbon dioxide: between about 2.5 to 8.5%, oxygen: between about 0.1 to 0.8%, helium: between about 25 to 60%, with argon making up the balance of the 100% volume.

It has been found that the gas formulation should preferably be focused to narrower ranges for the three main forms of ferrous workpieces, i.e., low carbon or mild steel, low alloy steel and stainless steel. Table I below gives ranges which have been found to be preferable for these specific materials. The percentages given will vary somewhat due to commercial gas purities which run about plus or minus 2%. Thus, it has been found that plus or minus about 5% of the percentage given for each individual gas is tolerable.

TABLE I

Formulation Ranges for Specific Ferrous Workpieces

| | % $CO_2$ | % $O_2$ | % He | % Ar |
|---|---|---|---|---|
| Low carbon (mild) steel | 6.7–8.5 | 0.3–0.8 | 25–35 | remainder |
| Low alloy steel | 3.1–4 | 0.15–0.35 | 49–57 | remainder |
| Stainless steel | 2.5–3.4 | 0.10–0.3 | 52–60 | remainder |

It has been determined that the following five relationships between the gases in the mixture should be observed in determining the mixture.

$$(CO_2 + O_2) + (Ar + He) = 100\% \quad (1)$$

$$\frac{CO_2}{O_2} \approx \frac{20}{1} \text{ (for short-circuiting transfer and also for spray transfer)} \quad (2)$$

$$\frac{CO_2}{O_2} \approx \frac{10}{1} \text{ (for spray transfer)} \quad (2a)$$

(3) The oxidation potential of the oxygen found free and combined in the form of carbon dioxide should be in the range of 0.9 to 2.6. More specifically, it is conventionally calculated as follows: % $O_2 + \frac{1}{4}$% $CO_2$, which has been found by calculation to be the figure set forth in Table II below:

TABLE II

| | Range | Preferred |
|---|---|---|
| Low carbon steel | 2.2–2.6 | 2.4 |
| Low alloy steel | 1.08–1.20 | 1.14 |
| Stainless steel | 0.9–1.02 | 0.96 |

The above oxidation potential relationships may change slightly as the metal material changes with more or less carbon, alloys and the like but the foregoing gives a reasonably accurate and workable range.

(4) The proportion of helium in the gas is calculated as: % He = 72.65 − 5.65 (% $CO_2$), which has been an experimentally determined formula or relationship. However, it can be varied a small amount without substantially affecting results, although the exact variation has not been completely determined to date.

(5) The balance of the gas following the above formulation requirements, will be argon.

It has been found that a carbon dioxide to oxygen ratio of about 20 to 1 is preferable for use with the short-circuiting transfer technique and can also be used with the spray transfer technique. But, where only the spray transfer technique is used, it is preferable to lower the ratio towards about 10:1. Thus, the preferable mixtures are given in Tables III and IV:

TABLE III

Formulation ranges for $CO_2:O_2$ ratio equal to 20:1

| | % $CO_2$ | % $O_2$ | % He | % Ar |
|---|---|---|---|---|
| Low carbon steel | 8 | 0.4 | 27.4 | remainder |
| Low alloy steel | 3.8 | 0.2 | 51.2 | remainder |
| Stainless steel | 3.2 | 0.15 | 54.5 | remainder |

TABLE IV

Formulation ranges for $CO_2:O_2$ ratio equal to 10:1

| | % $CO_2$ | % $O_2$ | % He | % Ar |
|---|---|---|---|---|
| Low carbon steel | 6.9 | 0.7 | 34 | remainder |
| Low alloy steel | 3.3 | 0.3 | 54 | remainder |
| Stainless steel | 2.7 | 0.25 | 57 | remainder |

As an example of the operating parameters, using a 0.045 in.(1.14 mm) diameter wire electrode, the stick-out will be approximately 0.625 or ⅝ths inch beyond the end of the nozzle with the same amount recessed within the nozzle. That is, the total stick-out is about 1.250 inch.

The wire electrodes, which can be either flux covered or bare, are of the conventional consumable type with a diameter ranging from 0.030 inches to 3/32 of an inch (0.8 mm to 2.4 mm). The size can be as low as 0.020 inches (10.5 mm) to 5/32 inch (4 mm).

The wire feed rate will vary depending upon wire thickness and current flow but generally will be within the range of 100 to 990 inches per minute. As a specific example, with a current of 90 amps and with a 0.045 in (1.14 mm) diameter wire, the feed will be approximately 88.6 in/min (2¼ meters per minute). With 440 amps the feed will be 990 inches per minute (25 meters per minute).

In the following typical example, the base metal is carbon (mild) steel, and the electrodes employed comply to the AWS specification, A 5. 18-79, ranging from ER70S-2 to ER70S-7. In special cases ER70S-6 can also be used.

The electrical current will typically range from 90 amps through 440 amps with about 220 amps being the transition current, for 0.045 in (1.14 mm), between drops that are larger than the diameter of the wire and droplets or drops that are the same size and smaller than the diameter of the wire. The voltage varies roughly from 20 to 10% of the amperage or more specifically, from 90-440 amps, the voltage will vary from about 19 to 42 volts. The actual voltage and amperage is determined by adjustments made by the welder during welding. By appropriately adjusting the amperage and voltage, drops which are approximately the size of the diameter of the wire are formed. For lower current, the drops are larger and with increased current the drops decrease in size. For short-circuiting transfer, lower current is used. For spray transfer, the current is increased, producing smaller size drops, with an increase in the melting rate and metal deposition into the weld pool.

The gas flow can be varied to the range of between about 25 to 60 cubic feet per hour with a low gas pressure, such as slightly above atmospheric pressure. Thus, the low pressure flow of gas through the passageways in the diffuser results in the gas being directed along a very shallow angle towards the interior wall of the nozzle where the flow is re-directed into the desired laminar flow.

For out-of-position welding, the short-circuiting, short arc deposition technique is used. As illustrated in the drawings, the welding torch or gun can be turned upside down and will form satisfactory overhead welds as well as inclined welds, vertical up and down welds and the like. Where there is no need for out-of-position welding, with an increase in amperage and voltage, the smaller droplets of the spray transfer system will be formed and this system can by utilized for rapid deposition of molten weld material for weld applications in the flat position.

The weld method described herein produces a smooth and stable arc and axially, relative to the wire, directed drop movement, resulting in a controlled, accurately formed linear weld bead. The operation is virtually spatter-free. The quantity of slag produced on the bead is minimal.

With this method, there is a substantial reduction in ozone, believed to be roughly ⅔ to ¾ reduction from normal ozone production obtained while welding with the shielding gases that contain a high amount of argon (e.g., over 75% argon), and a very substantial reduction in fumes generated by the welding. Moreover, the smoother bead shape results not only in better cosmetic appearance, but also in a reduction in the amount of weld wire needed for comparable strength welds. Further, it has been found that there is less porosity and reduced hydrogen content in welds formed by this method, possibly due to a more effective buring out of hydrogenous impurities remaining from the wire drawing operation by the pre-heating of the wire. Also, there are good penetration characteristics, particularly avoiding the deep finger-like fusion zone produced by other methods and instead forming a broader, bowl-like shape penetration. In this weld system, undercutting is reduced and there is absence of lack of fusion with the base material. Also, there is a high resistance to weld cracking, apparently due to an appropriate grain structure in the bead, with the grains tending to radiate from a central point near the upper portion of the weld bead. The welds formed have good mechanical properties, that is, adequate strength, high impact properties.

Most significantly, there is a very high melting rate so that there is correspondingly a very high weld deposition rate.

Although the process is essentially a hotter than normal welding process, it can be used as a "cold process" by reducing electrical current in welding sheet metal materials thereby reducing spatter and still give a higher melting rate and weld metal deposition rate than prior systems of welding. This is particularly useful in welding sheet metal.

While the method herein is described in connection with welding, which generally refers to joining together two pieces of metal, it also is applicable to surfacing or hard facing. That is, in places where a weld-like coating is applied upon a substrate for hard surfacing, for example, this method may likewise be used. Instead of a bead being formed, the weld material is spread over the surface area to the depth required. Thus, the term welding as used in this application also encompasses, when applicable, this particular form of coating or hard surfacing.

Having fully described an operative embodiment of this invention, I now claim:

1. A gas-metal-arc welding method for substantially spatter-free, high melting rate welding, useful for out-of-position welding of ferrous metals using a consumable, wire electrode held in a contact tip of a continuous feeding type, gas-metal-arc welding gun for continuously advancing the electrode longitudinally towards a weld deposit, with an electrode end positioned adjacent to, for forming an arc gap with, a weld pool deposit location, comprising the steps of:

flowing through the electrode an electrical current of sufficient, predetermined amperage and voltage to melt the electrode and for forming molten drops thereon which are deposited upon the weld pool;

pre-heating and increasing the melting rate of the electrode by continuously maintaining a relatively long electrode extension beyond the contact tip;

continuously flowing a substantially longitudinally laminar stream of gas around the contact tip, the electrode extension and the gap, with said gas comprising a major proportion of an argon and heium mixture and a minor proportion of a carbon dioxide and oxygen mixture, and transferring the molten drops to the weld pool by either short-circuiting the drops to the pool for inclusion of the drops in the pool for out-of-position or flat position welding or alternatively, by spray transfer deposition of the drops from the electrode end to the pool when welding in the flat position only; and the approximate volumetric relationships of the gases being calculated as:

(1) carbon dioxide between about 2.5–8.5%, oxygen between about 0.1–0.8%, helium between about 25–60%, and argon the remainder, and (2) with the ratio between carbon dioxide and oxygen being at approximately 10:1 to about 20:1;

(3) and with the oxidation potential relationship of the shielding gas calculated as the sum of the percent oxygen and ¼ of the percent carbon dioxide, being between about 0.96 to 2.4;

(4) and with the percentage amount of helium in the total gas being calculated as being approximately 72.65 minus 5.65 times the percent of the carbon dioxide.

2. A method as defined in claim 1, and including vigorously cooling the contact tip.

3. A method as defined in claim 1, and wherein the gas mixture comprises:
   percent carbon dioxide between about 6.7–8.5
   percent oxygen between about 0.3–0.8
   percent helium 25–35%, and
   the balance being argon.

4. A method as defined in claim 1, and wherein said gas composition comprises:
   carbon dioxide between about 3.1–4% oxygen between about 0.15–0.35%
helium between about 49–57%, and
the remainder being argon.

5. A method as defined in claim 1, and wherein said gas mixture comprises:
carbon dioxide between about 2.5–3.4%
oxygen between about 0.10–0.3%
helium between about 52–60%, and
the remainder argon.

6. A method as defined in claim 1, and wherein the carbon dioxide to oxygen ratio equals approximately 20 to 1.

7. A method as defined in claim 1, and including the carbon dioxide to oxygen ratio being approximately 10 to 1.

* * * * *